May 23, 1961   R. V. ROWLES ET AL   2,984,981
HYDRAULIC PRESS APPARATUS
Original Filed June 23, 1952   2 Sheets-Sheet 1
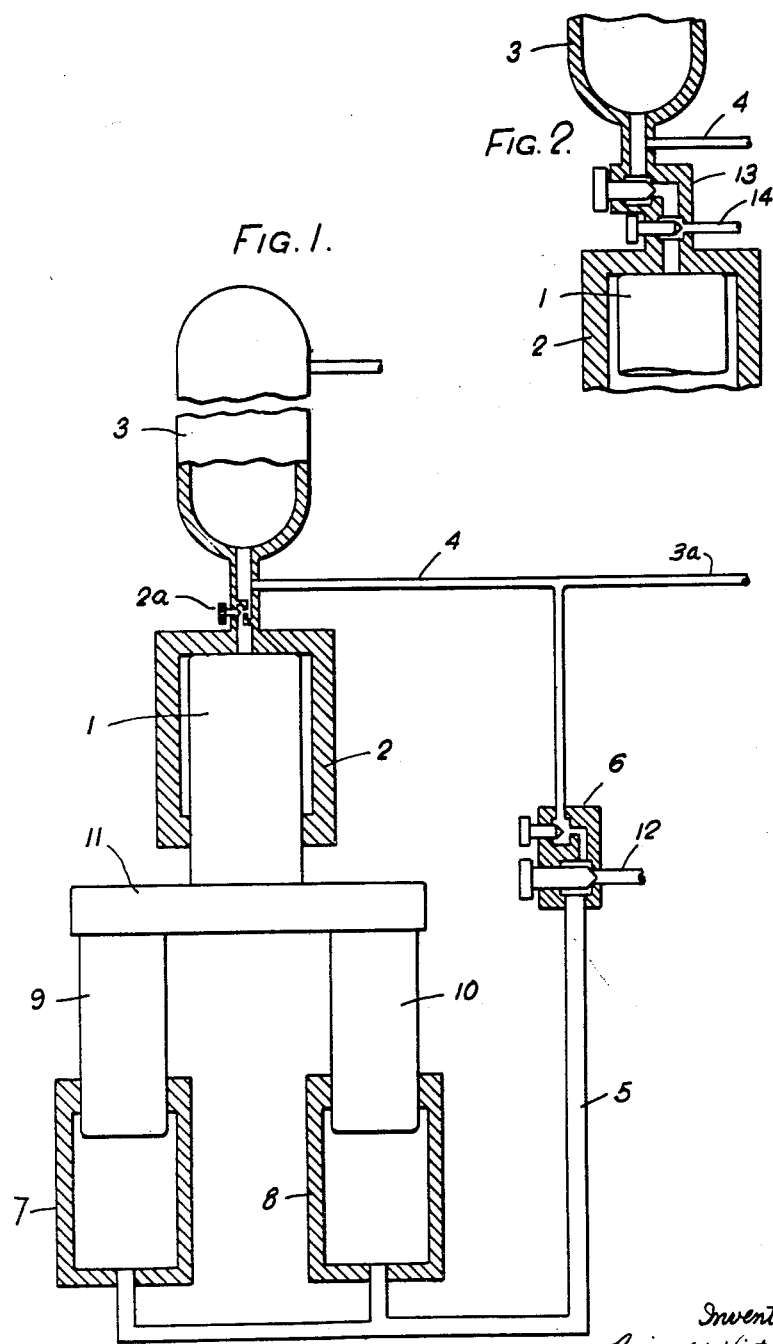

May 23, 1961  R. V. ROWLES ET AL  2,984,981
HYDRAULIC PRESS APPARATUS
Original Filed June 23, 1952  2 Sheets-Sheet 2
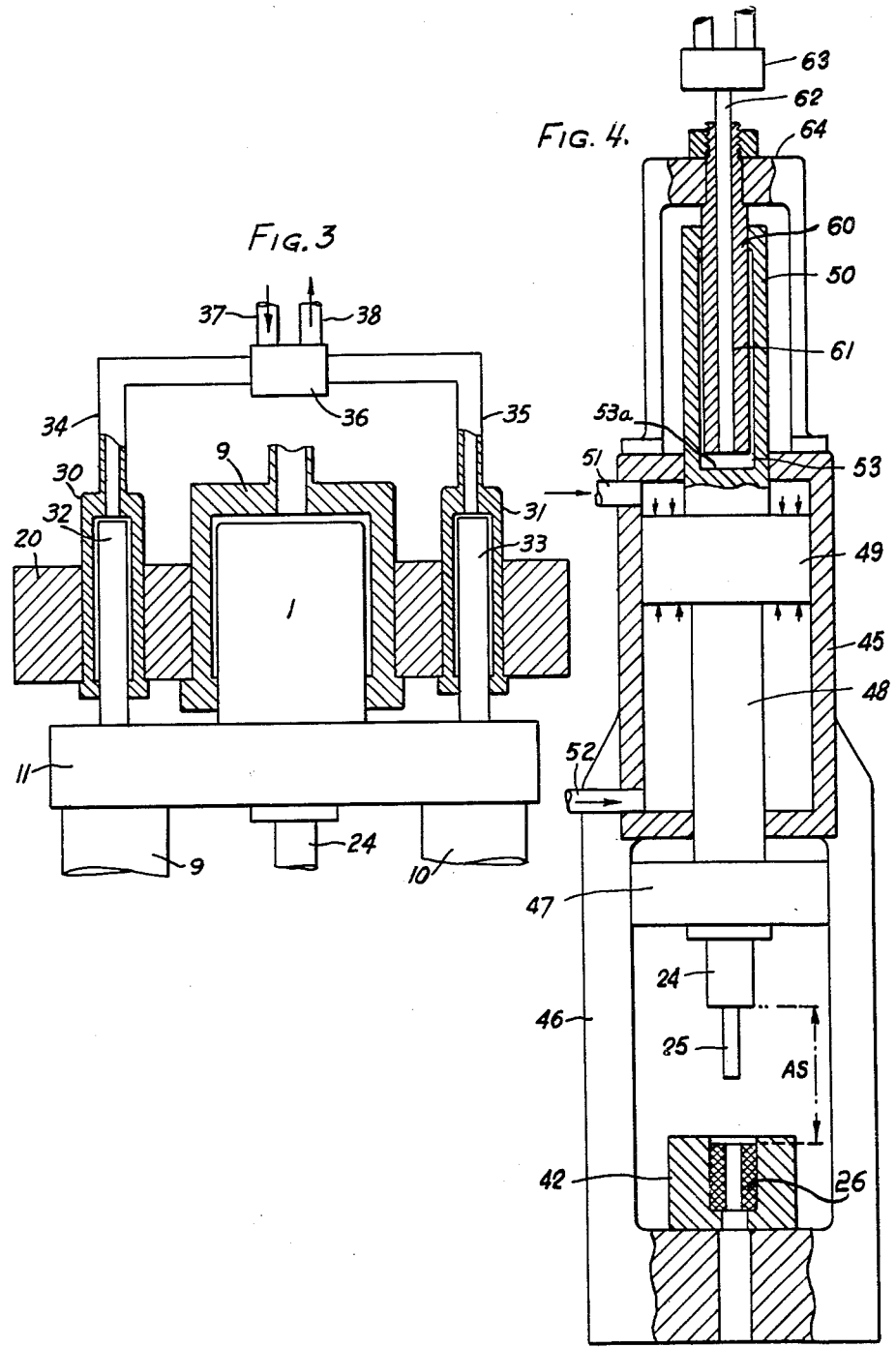
Inventors:
Reginald Victor Rowles
and
Bertram Thomas Gowing
By Baldwin & Wight, Attorneys

United States Patent Office 2,984,981
Patented May 23, 1961

2,984,981

HYDRAULIC PRESS APPARATUS

Reginald Victor Rowles and Bertram Thomas Gowing, Gloucester, England, assignors, by mesne assignments, to Anglo-American Extrusion Company, Wilmington, Del., a corporation of Delaware Original application June 23, 1952, Ser. No. 295,097. Divided and this application Dec. 5, 1960, Ser. No. 73,639

Claims priority, Great Britain June 19, 1952

5 Claims. (Cl. 60—51)

This application is a division of application Serial No. 295,097, for Hydraulic Press Apparatus, filed in the United States Patent Office June 23, 1952, in the names of Reginald Victor Rowles, Robert Madeley, and Bertram Thomas Gowing.

This invention relates to hydraulic presses and control arrangements for hydraulic piston means or rams of such presses and while it has particular application to the control of rams used in extrusion presses, in pressure forging and upsetting processes for example, it will be seen to be capable of wide application.

In the case of mechanically powered impact extrusion presses of the crank operated type, it is recognized that the duration of the power stroke is quite short and that there is no uniform power follow-up. In such presses there is also a rapid increase of power which frequently leads to the overloading of the tools which under normal working conditions are already highly stressed and such over-stressing may lead at times to fracture of the press frame.

According to the present invention, a hydraulic press apparatus comprising a piston means or ram and cylinder means and also an auxiliary approach stroke ram or piston and cylinder means therefor and a source of stored fluid pressure is so constructed that the power available from said source is released to the piston means or ram instantaneously or substantially instantaneously. It follows that a velocity is imparted to the ram greatly in excess of that which would result from relatively slow release of the power available and, in contradistinction to a mechanically powered ram, a hydraulic ram operated in accordance with the invention maintains a substantially constant level of power throughout its working stroke.

The source of fluid pressure preferably is constituted by a gas loaded hydraulic accumulator and the loading is pre-set in accordance with the power required to perform any particular operation.

Apparatus embodying the invention is usable advantageously for performing various operations, such as the working of materials including metals, the full hydraulic power required to effect an operation on a piece of material being released to the ram instantaneously or substantially so. Press apparatus embodying the present invention may be employed, for example, for the extrusion of cold metal billets by the percussion or impact extrusion method disclosed in the application of Archibald Claude Bridge, Serial No. 212,728, filed February 26, 1951, now United States Patent No. 2,753,994. The piston structure may be so adjusted that immediately prior to the effective application of the full accumulator power to the piston structure the extrusion ram or thrust member rests in contact with a billet to be extruded so that extrusion commences immediately on release of said power. Alternatively in the case of metal working processes or extrusion processes, the work engaging ram or thrust member is adjusted so that immediately prior to the application of hydraulic power thereto, it is spaced from the work and the full power required to effect a complete or partial operation on the material is released instantaneously or substantially instantaneously, the space between the work engaging ram and the work being such that before impact, the ram acquires a desired kinetic energy, which is imparted to the work.

The hydraulic piston means or ram is restrained from movement by means which may quickly be released so as to enable the ram instantaneously or substantially instantaneously to perform its working stroke. Preferably, a hydraulic piston or ram means is arranged to oppose the main hydraulic piston area or ram and to hold it until the cylinder of the holding piston area or ram means is opened to exhaust. In carrying out the invention as applied to extrusion processes, either the indirect or the direct process of extrusion may be employed.

It will be appreciated that during the approach stroke of the piston means which operates the work engaging ram, that is to say that portion of its travel in which it has approached the work, for example a slug or a billet to be extruded, relatively less power is required than during the actual working stroke and in order to enable economy in power to be effected during the approach stroke, according to this invention, hydraulic apparatus comprising a main piston working area or ram and at least one holding piston area or ram, also comprises at least one further piston area or ram, arranged when desired to oppose the holding piston area or ram sufficiently to allow the main piston area or ram to traverse through at least its approach stroke upon completion of which the full hydraulic power required to effect the power stroke of the main piston area or ram is applied thereto.

According to a still further feature of the invention the functions of the main and the holding piston areas or rams are performed by a common piston means or ram assembly formed with opposed pressure surface areas selected to provide an area differential such that the liquid pressure load applied from a common source to the opposed surfaces simultaneously, will maintain the piston or ram assembly in a predetermined position.

The main piston or ram assembly, according to this invention, embodies an auxiliary piston or ram arranged to drive the piston or ram assembly through the whole or part of its approach stroke against the holding or restraining pressure, the auxiliary piston or ram thus serving the purpose of the separate additional piston or ram provided to save power during the approach stroke.

In order that the invention may be clearly understood certain forms of apparatus, representative rather than definitive of the invention, and constructed and arranged for operation in accordance therewith will now be described in greater detail by way of example with reference to the accompanying drawings in which:

Fig. 1 is an explanatory diagram illustrating one method of operating a hydraulic piston or ram;

Fig. 2 is an explanatory fragmentary diagram of an alternative arrangement;

Fig. 3 illustrates the application of the feature of power saving piston areas or rams to a hydraulic press in accordance with the invention; and Fig. 4 is a development of the press shown in Fig. 3 in which the functions of the power saving piston areas or rams illustrated in Fig. 3 are combined with a single piston or ram assembly.

Referring to Fig. 1 of the drawings, the main ram or pressure applying element 1 of a hydraulic press has its enclosing cylinder 2 continuously connected through a needle valve 2a to an expansive gas loaded hydraulic accumulator 3. The permanent fluid column between the accumulator and the cylinder maintains the ram element constantly subjected to fluid pressure tending to effect a working stroke and of sufficient magnitude to cause the ram element to perform the required operation, e.g. an extrusion operation. The constant communication between the accumulator and the cylinder also provides a cushion effect in the application of power through the pressure medium and safeguards from shock stresses any tools acted upon by the piston or ram means. The accumulator is also connected through pipes 4 and 5 via a three-way valve 6 with the enclosing cylinders 7 and 8 of two other rams 9 and 10 which, for convenience, will be termed the holding rams and which are mounted so that in the pressure position of the three-way valve as shown, the holding rams will be subjected to hydraulic pressure directly from the accumulator 3 at the same unit pressure as is applied to the main ram 1 and will drive the main ram into its cylinder through the medium of a cross-head 11, against the action of the gas loaded accumulator 3. In the construction shown in Fig. 1, the rams 1, 9 and 10, connected by the cross-head 11, constitute a piston means in which the upper end of the ram 1 provides a main working area and the lower ends of the rams 9 and 10 together provide an aggregate holding area greater than the main working area. Thus, the holding rams, when subjected to a fluid column extending from the accumulator to the cylinders 7 and 8, are capable of restraining the main ram in its cylinder against the pressure applied to it from the hydraulic accumulator, the hold being maintained until the three-way valve is placed in the exhaust position to put the cylinders 7 and 8 in communication with the exhaust pipe line 12. When the three-way valve is so operated, the restraint on the ram is suddenly released and the full power of the hydraulic accumulator is applied extremely rapidly to the main ram which is thus driven with considerable velocity to impact the work, the holding rams retracting freely against exhaust. The capacity of the hydraulic accumulator in relation to the enclosing cylinder 2 of the main ram 1 is such that, after initial release of the ram, the applied power is maintained at a steady high level throughout the working stroke of the ram. A pipe 3a may be provided for supplying make-up hydraulic fluid from a pump, not shown.

The purpose of the needle valve 2a is variably to restrict the flow of pressure fluid to the cylinder 2 and thus to control the velocity of the ram 1 and it is preset to adjust the velocity in accordance with the operation to be performed by the ram. The provision of the needle valve is not essential in cases where the facility of adjustment is not desired, but it will be understood that the velocity of the ram in such cases, assuming a given pressure loading of the hydraulic accumulator, will be determined by the diameter of the pipe connecting the hydraulic accumulator and the cylinder 2, or by the relative freedom with which fluid may be discharged from the cylinders 7 and 8, determined by the size of the pipe 5 and the flow opening provided by the valve means associated with the pipe 5.

In an alternative control arrangement illustrated by the fragmentary diagram, Fig. 2, the enclosing cylinder 2 of the main ram 1 is connected through a three-way valve 13 to the gas loaded hydraulic accumulator 3. In one, the pressure position of the valve, the cylinder 2 is connected directly with the hydraulic accumulator, the valve being sufficiently large to permit rapid entry of the pressure fluid to the cylinder. The second position of the three-way valve as shown in Fig. 2 is the normal exhaust position in which the cylinder 2 is in communication with the exhaust pipe line 14.

The alternative arrangement is otherwise similar to Fig. 1 and the hydraulic accumulator is also connected through a second three-way valve, as in the case of Fig. 1 with the cylinders of the holding rams. In the pressure position of the second three-way valve the holding rams drive the main ram into its cylinder, the first three-way valve 13 being in the exhaust position. In this case also, the holding rams are capable of retaining the main ram in its cylinder against the power applied to it from the hydraulic accumulator when the first three-way valve 13 is operated to the pressure position, the holding being maintained until the second three-way valve is operated to the exhaust position. When the latter valve is so operated, the full power of the hydraulic accumulator is applied to the main ram.

The apparatus may be designed with only one holding piston area or it may be found desirable to employ more than two holding piston areas as a matter of convenience in design of the apparatus and if, for example, more than two holding piston areas are provided, their cylinders are supplied in parallel from the hydraulic accumulator through the three-way valve.

The press described may find application wherever a high pressure, high velocity piston or ram is required, for example, in pressure forging, upsetting processes or extrusion. In the subsequent description, the invention will be described in its application to extrusion presses, but it will be appreciated that the extrusion application of the invention has been referred to simply by way of example and that the presses described may be provided with tools for performing other operations. For this reason no tools have been shown associated with the ram of the press illustrated in Fig. 1 of the drawings.

As previously indicated, much less power is required to traverse the main ram through the approach stroke than through its working stroke, and the press shown in Fig. 3 of the drawings is provided with auxiliary rams for the purpose of driving the main ram through the approach stroke against the pressure differential of the main ram and of the holding rams.

Referring to Fig. 3 only portions of the holding rams 9 and 10 and a thrust rod 24 are shown. It will be seen that the fixed cross-head 20 carrying the main cylinder 2 has mounted in it two smaller cylinders 30 and 31 containing pistons or rams 32 and 33 which engage or are assembled to the cross-head 11. The rams 32 and 33 may conveniently be referred to as the approach rams or pistons. The cylinders 30 and 31 are connected by pipes 34 and 35 respectively to a control valve 36 having a fluid pressure inlet pipe 37 and an exhaust pipe 38.

In operation of the press shown in Fig. 3, in the open position of the press, the main cylinder 2 and the holding cylinders associated with the rams 9 and 10 are in communication with the accumulator, and the pressure applied to the main working area atop the main ram 1 is restrained by that applied to the holding areas at the lower ends of the rams 9 and 10 as already described, the latter pressure being in excess of the main ram pressure by a differential which may be conveniently designated Y tons.

When it is desired to effect the approach stroke of the main ram, the three-way valve 36 controlling the approach rams 32 and 33 is operated so that a pressure in excess of the differential Y tons by a desired amount, is applied to the approach rams to act in conjunction with the main piston area atop the ram 1 and exert sufficient pressure in addition to the pressure applied to the main piston area to overcome the preponderance of holding pressure acting on the holding areas of the pistons 9 and 10. The pressure acting on the main piston area, thus supplemented by that acting on the auxiliary pistons or rams 32, 33, will then force back the holding rams and allow the main ram to commence and complete its approach stroke. This will take place because the aggregate of the main piston or ram area and the auxiliary piston areas is greater than the aggregate holding area provided by the rams or pistons 9 and 10. The hydraulic fluid in the holding ram cylinders is thus forced back to the hydraulic accumulator at the same pressure as that in the accumulator. On completion of the approach stroke, the three-way valve which controls the holding rams is suddenly opened to exhaust and the full pressure of the hydraulic accumulator is instantaneously effective upon the main ram which then completes its power stroke to effect extrusion of the billet.

The valve 36 controlling the approach rams may be held in the pressure or the exhaust position during the power stroke but in order to return the main ram after completion of the power stroke, this valve is closed to pressure and opened to exhaust while the valve controlling the holding rams is opened to pressure and closed to exhaust. The main ram is thus retracted into its cylinder by the pressure differential Y previously referred to and the apparatus is ready for the cycle to be repeated.

As shown in Fig. 4 the press described with reference to Fig. 3 of the drawings may be developed to embody the main, holding and power saving rams in a single ram assembly. In this embodiment a single piston 49 in a cylinder 45 carried in the press frame 46 is provided with both a piston rod 48 and a tail rod 50 projecting respectively through opposite ends of the cylinder 45. The tail rod 50 is of greater cross sectional area than the piston rod 48, with the result that when accumulator pressure is applied to opposite sides of the piston 49 through conduits 51 and 52 a pressure differential (such as the Y tons referred to in connection with the embodiment of Fig. 3) is set up, and the single piston may function both as the main ram and the holding ram. A cross head 47 on the rod 48 carries a thrust rod 24 and a mandrel 25 for operating upon the billet 26 in a container 42 when the ram assembly is moved through the approach stroke AS.

The approach ram is embodied in the tail rod 50. This rod is bored to form a cylinder 53 receiving a stationary stem 60.

The stem 60 is itself formed with a central bore 61 which opens at the lower end into the cylinder 53 and communicates at its upper end through a pipe 62 and control valve 63 with a source of pressure liquid not shown. The stem 60 is fixed to a yoke 64 which surmounts the cylinder 45 of the main ram assembly, the latter being shown at the top of its stroke. The lower surface or wall of the cylinder bore 53 provides an auxiliary ram or piston area 53a which will be referred to as a power saving or approach ram or piston. In the unitary piston construction shown in Fig. 4, the main working area atop the piston 49 and the auxiliary piston area 53a both face oppositely to the direction of working stroke movement, whereas the holding area underneath the piston 49 faces oppositely to the direction of return stroke movement.

When it is desired to effect the approach stroke represented by the arrow headed line AS, pressure liquid is supplied to the power saving ram cylinder 53 giving a load slightly in excess of the differential Y previously mentioned with the result that the ram assembly is lowered against the return and holding pressures, the pressure liquid in the main cylinder 45 below the piston 49 being returned to the hydraulic accumulator via a pipe 52 and thus to the top face of the piston 49 through a pipe 51. It will be appreciated that, as the stem 60 is fixed to its supporting yoke 64 it cannot itself move, so that the supply of pressure liquid to its cylinder 53 must constrain the cylinder and auxiliary piston 53a, which forms part of the main ram assembly, to descend. The rate of descent is easily controllable and apart from the saving of power effected by the arrangement described, the provision of a controllable rate of approach facilitates determination of the accuracy of the setting up of tools as, when tools have been assembled in the press, the thrust rod or other member actuated by the ram assembly may be lowered gradually to test registration with the work or work holder.

It will be understood that, although in the example described with reference to Fig. 4 of the drawings, the approach stroke is represented as extending up to the billet face, it may in fact extend to any desired point in front of the billet face, thus leaving a space providing for a free stroke before the thrust rod impacts the billet.

Although earlier in this specification, reference was made to extrusion of a cold billet, it is to be understood that such reference was merely to indicate the capabilities of a press constructed and arranged to operate in accordance with the invention. The disclosure of several modified embodiments of the invention makes it apparent that the term "piston means" as used herein applied to press constructions having holding rams or piston elements separate from but connected to main ram or piston elements as in the embodiments shown in Figs. 1 and 3; and also applies to constructions having unitary differential pistons as shown in Fig. 4.

We claim:

1. Hydraulic press apparatus comprising cylinder enclosed first piston means having a main piston area and a holding piston area opposed thereto and one of which is greater in effective pressure area than the other, a gas loaded hydraulic accumulator having a capacity compared to the capacity of the enclosing cylinder of said main piston area sufficient to supply substantially steady high level power throughout a substantially instantaneous full working stroke of said first piston means when the accumulator pressure is applied to said main piston area, a first conduit means connected at one end to said accumulator and at the other end to said enclosing cylinder of the main piston area continuously applying to said main piston area hydraulic pressure directly from said accumulator from the inception of and throughout said working stroke and having the capacity to transmit said steady high level power for said substantially instantaneous full working stroke of said piston means, a second conduit means connected at one end to said accumulator and at the other end to the enclosing cylinder of the holding piston for normally subjecting said holding piston area to hydraulic pressure directly from the same accumulator against the accumulator pressure exerted on said main piston area, cylinder enclosed auxiliary piston means connected with said first piston means to act in conjunction with the smaller piston area but in opposition to the greater piston area and having an effective pressure area greater than the difference between said first piston areas, means for providing controlled application of hydraulic pressure to the enclosing cylinder of said auxiliary piston means for exerting sufficient pressure on said auxiliary piston means in addition to the pressure applied to said smaller piston area to overcome the preponderance of said greater piston area pressure over said smaller piston area pressure and so control an approach movement of said first piston means, and valved control means for said second conduit means having a first setting in which both said main and holding piston areas are maintained under pressure from said accumulator and a working stroke setting in which the main piston area is continued under said accumulator pressure while the holding piston area is open to exhaust, said valved control means being actuatable directly from said first setting to said working stroke setting and which valved control means has the capacity for sudden substantially total exhaust of said holding pressure, whereby the said substantially instantaneous full working stroke of said first piston means may take place under the said steady high level power and the total effort of said first piston means may be instantaneously realized.

2. Hydraulic press apparatus comprising cylinder enclosed piston means having a main piston area and a holding piston area opposed to and greater in effective pressure area than said main piston area, a gas loaded hydraulic accumulator having a capacity compared to the capacity of the enclosing cylinder of said main piston area sufficient to supply substantially steady high level power throughout a substantially instantaneous full working stroke of said piston means when the accumulator pressure is applied to said main piston area, a first conduit means connected at one end to said accumulator and at the other end to said enclosing cylinder of the main piston area continuously applying to said main piston area hydraulic pressure directly from said accumulator from the inception of and throughout said working stroke and having the capacity to transmit said power for said substantially instantaneous full working stroke of said piston means, a second conduit means connected at one end to said accumulator and at the other end to the enclosing cylinder of the holding piston for normally subjecting said holding piston area to hydraulic pressure directly from the same accumulator to move said piston means to and to hold it in retracted position against the accumulator pressure exerted on said main piston area, auxiliary piston means connected with the first piston means to act when under hydraulic pressure in conjunction with said main piston area but in opposition to said holding piston area, and when so acting adding sufficient effective pressure to the pressure applied to said main piston area to overcome the preponderance of holding piston area pressure over said main piston area pressure, and control means including approach stroke valve means for effecting application of hydraulic pressure to said auxiliary piston means in advance of the working stroke of said piston means to bring about an approach movement of said piston means toward its working stroke, and working stroke valve means for said second conduit means having a first setting in which both said main and holding piston areas are maintained under pressure from said accumulator and a working stroke setting in which the main piston area is continued under said accumulator pressure while the holding piston area is open to exhaust, said working stroke valve means being actuatable directly from said first setting to said working stroke setting and which working stroke valve means has the capacity for sudden substantially total exhaust of said holding pressure, whereby said substantially instantaneous full working stroke of said piston means may take place under the said high level power and the total effort of said piston means may be instantaneously realized.

3. Hydraulic press apparatus comprising cylinder enclosed piston means having a main piston area and a holding piston area opposed to and greater in effective pressure area than said main piston area, a gas loaded hydraulic accumulator having a capacity compared to the capacity of the enclosing cylinder of said main piston area sufficient to supply substantially steady high level power throughout a substantially instantaneous full working stroke of said piston means when the accumulator pressure is applied to said main piston area, a first conduit means connected at one end to said accumulator and at the other end to said enclosing cylinder of the main piston area continuously applying to said main piston area hydraulic pressure directly from said accumulator from the inception of and throughout said working stroke and having the capacity to transmit said power for said substantially instantaneous full working stroke of said piston means, a second conduit means connected at one end to said accumulator and at the other end to the enclosing cylinder of the holding piston for normally subjecting said holding piston area to hydraulic pressure directly from the same accumulator to move said piston means to and to hold it in retracted position against the accumulator pressure exerted on said main piston area, auxiliary piston means connected with the first piston means to act when under hydraulic pressure in conjunction with said main piston area but in opposition to said holding piston area, and when so acting adding sufficient effective pressure to the pressure applied to said main piston area to overcome the preponderance of holding piston area pressure over said main piston area pressure, and control means including independently operable approach stroke valve means for effecting application of hydraulic pressure to said auxiliary piston means in advance of the working stroke of said piston means to bring about an approach movement of said piston means toward its working stroke, and independently operable working stroke valve means for said second conduit means having a first setting in which both said main and holding piston areas are maintained under pressure from said accumulator and a working stroke setting in which the main piston area is continued under said accumulator pressure while the holding piston area is open to exhaust, said working stroke valve means being actuatable directly from said first setting to said working stroke setting and which working stroke valve means has the capacity for sudden substantially total exhaust of said holding pressure, whereby said substantially instantaneous full working stroke of said piston means may take place under the said high level power and the total effort of said piston means may be instantaneously realized, the independent operability of said approach stroke valve means enabling controlling of the approach stroke while said working stroke valve means remains in its first setting to maintain accumulator pressure on both said main piston area and said holding piston area.

4. Hydraulic press apparatus comprising cylinder enclosed piston means having a main piston area and a holding piston area opposed to and greater in effective pressure area than said main piston area, a gas loaded hydraulic accumulator having a capacity compared to the capacity of the enclosing cylinder of said main piston area sufficient to supply substantially steady high level power throughout a substantially instantaneous full working stroke of said piston means when the accumulator pressure is applied to said main piston area, a first conduit means connected at one end to said accumulator and the other end to said enclosing cylinder of the main piston area for applying to said main piston area hydraulic pressure directly from said accumulator from the inception of and throughout said working stroke and having the capacity to transmit said power for said substantially instantaneous full working stroke of said piston means, a second conduit means connected at one end to said accumulator and at the other end to the enclosing cylinder of the holding piston for normally subjecting said holding piston area to hydraulic pressure directly from the same accumulator to move said piston means to and to hold it in retracted position against the accumulator pressure exerted on said main piston area, auxiliary cylinder enclosed piston means connected with the first piston means to act when under hydraulic pressure in conjunction with said main piston area but in opposition to said holding piston area, and when so acting adding sufficient effective pressure to the pressure applied to said main piston area to overcome the preponderance of holding piston area pressure over said main piston area pressure, and valved control means including a first setting in which the main and holding piston areas are subjected to said accumulator pressure while the auxiliary piston means is not subjected to said accumulator pressure, an approach stroke setting in which the main and holding piston areas are subjected to said accumulator pressure and said auxiliary piston means is also subjected to hydraulic pressure, and a working stroke setting in which the main piston area is subjected to said accumulator pressure and said auxiliary piston means is still subjected to hydraulic pressure while the holding piston area is open to exhaust, said valved control means being actuatable directly from each of said settings to the next setting in succession and from the last of said settings directly back to the first said setting, and said valved control means having the capacity for sudden substantially total exhaust of said holding pressure, whereby said substantially instantaneous full working stroke of said piston means may take place under the said high level power and the total effort of said piston means may be instantaneously realized.

5. Hydraulic press apparatus comprising cylinder enclosed piston means having a main piston area and a holding piston area opposed to and greater in effective pressure area than said main piston area, a gas loaded hydraulic accumulator having a capacity compared to the capacity of the enclosing cylinder of said main piston area sufficient to supply substantially steady high level power throughout a substantially instantaneous full working stroke of said piston means when the accumulator pressure is applied to said main piston area, a first conduit means connected at one end to said accumulator and at the other end to said enclosing cylinder of the main piston area for applying to said main piston area hydraulic pressure directly from said accumulator from the inception of and throughout said working stroke and having the capacity to transmit said power for said substantially instantaneous full working stroke of said piston means, a second conduit means connected at one end to said accumulator and at the other end to the enclosing cylinder of the holding piston for normally subjecting said holding piston area to hydraulic pressure directly from the same accumulator to move said piston means to and to hold it in retracted position against the accumulator pressure exerted on said main piston area, auxiliary cylinder enclosed piston means connected with the first piston means to act when under hydraulic pressure in conjunction with said main piston area but in opposition to said holding piston area, and when so acting adding sufficient effective pressure to the pressure applied to said main piston area to overcome the preponderance of holding piston area pressure over said main piston area pressure, and control means including independently operable approach stroke valve means having a first setting for connecting the enclosing cylinder of said auxiliary piston means to exhaust and being directly actuatable to an approach stroke setting for effecting application of hydraulic pressure to said auxiliary piston means in advance of the working stroke of said piston means to bring about an approach movement of said piston means toward its working stroke, and independently operable working stroke valve means for said second conduit means having a first setting in which both said main and holding piston areas are maintained under pressure from said accumulator and a working stroke setting in which the main piston area is continued under said accumulator pressure while the holding piston area is open to exhaust, said working stroke valve means being actuatable directly from said first setting thereof to said working stroke setting thereof and having the capacity for sudden substantially total exhaust of said holding pressure, whereby said substantially instantaneous full working stroke of said piston means may take place under the said high level power and the total effort of said piston means may be instantaneously realized, the independent operability of said approach stroke valve means from its said first setting to its said approach stroke setting enabling controlling of the approach stroke while said working stroke valve means remains in its said first setting to maintain accumulator pressure on both said main piston area and said holding piston area, said approach stroke valve means and said working stroke valve means being each operable directly back to its said first setting upon completion of a working stroke of said piston means for effecting a return stroke thereof by re-application of hydraulic pressure directly from said accumulator to said holding piston area.

References Cited in the file of this patent

UNITED STATES PATENTS

| | | |
|---|---|---|
| 495,499 | List | Apr. 18, 1893 |
| 523,419 | Thorpe | July 24, 1894 |
| 1,317,238 | Summey | Sept. 30, 1919 |
| 1,826,363 | Miedbrodt | Oct. 6, 1931 |
| 2,088,134 | Haessler | July 27, 1937 |
| 2,132,974 | Sentance et al. | Oct. 11, 1938 |
| 2,142,628 | Ballert | Jan. 3, 1939 |
| 2,410,581 | Hess et al. | Nov. 5, 1946 |
| 2,465,580 | Ernst et al. | Mar. 29, 1949 |

FOREIGN PATENTS

| | | |
|---|---|---|
| 613,588 | Germany | May 22, 1935 |
| 21,805 | Great Britain | Nov. 9, 1904 |
| 534,401 | Great Britain | Mar. 6, 1941 |